US008958966B2

(12) United States Patent
Nohira et al.

(10) Patent No.: US 8,958,966 B2
(45) Date of Patent: Feb. 17, 2015

(54) VEHICLE BRAKING CONTROL DEVICE

(71) Applicant: Advics Co., Ltd., Kariya (JP)

(72) Inventors: Shun Nohira, Anjyo (JP); Naoki Yabusaki, Toyota (JP); Shinsuke Yamamoto, Anjyo (JP)

(73) Assignee: Advics Co., Ltd., Kariya, Aichi-Pref (JP)

( * ) Notice: Subject to any disclaimer, the term of this patent is extended or adjusted under 35 U.S.C. 154(b) by 0 days.

(21) Appl. No.: 14/130,796

(22) PCT Filed: Sep. 28, 2012

(86) PCT No.: PCT/JP2012/075053
§ 371 (c)(1),
(2) Date: Jan. 3, 2014

(87) PCT Pub. No.: WO2013/047735
PCT Pub. Date: Apr. 4, 2013

(65) Prior Publication Data
US 2014/0200784 A1 Jul. 17, 2014

(30) Foreign Application Priority Data
Sep. 29, 2011 (JP) ................. 2011-214947

(51) Int. Cl.
*G06F 7/70* (2006.01)
*B60T 8/17* (2006.01) *B60T 8/88* (2006.01)
*B60T 13/66* (2006.01)
*B60T 13/74* (2006.01)
*B60T 8/1755* (2006.01)

(52) U.S. Cl.
CPC . *B60T 8/17* (2013.01); *B60T 8/885* (2013.01); *B60T 13/662* (2013.01); *B60T 13/741* (2013.01); *B60T 8/1755* (2013.01); *B60T 2270/406* (2013.01)

USPC .......................................... 701/70

(58) Field of Classification Search
CPC ........ B60T 8/17; B60T 13/741; B60T 8/1755
USPC .......................................... 701/70
See application file for complete search history.

(56) References Cited

U.S. PATENT DOCUMENTS 6,199,670 B1    3/2001  Shirai et al.

FOREIGN PATENT DOCUMENTS

| JP | 11-236936 A | 8/1999 |
| JP | 2001-158336 A | 6/2001 |
| JP | 2005-104252 A | 4/2005 |

OTHER PUBLICATIONS

International Search Report (PCT/ISA/210) mailed on Oct. 23, 2012, by the Japanese Patent Office as the International Searching Authority for International Application No. PCT/JP2012/075053.
International Preliminary Report on Patentability issued on Apr. 8, 2014 by the International Bureau of WIPO in International Application No. PCT/JP2012/075053, and an English language translation of the International Preliminary Report on Patentability (7 pgs).

*Primary Examiner* — John Q Nguyen
*Assistant Examiner* — Jordan S Fei
(74) *Attorney, Agent, or Firm* — Buchanan Ingersoll & Rooney PC

(57) ABSTRACT

Each of a plurality of electric brake devices corresponds to one of a plurality of wheels and includes a motor. A brake ECU, which controls the electric brake devices, determines whether there is an overheated motor of which the temperature T is greater than or equal to a first set threshold value Tth1. Also, when there is only one overheated motor, the brake ECU reduces a current value Ix for the overheated motor at a more gradual gradient in the case where the temperature T of the overheated motor is low than in the case where the temperature is high.

7 Claims, 6 Drawing Sheets

VEHICLE BRAKING CONTROL DEVICE

TECHNICAL FIELD

The present invention relates to a vehicle braking control device, which controls a plurality of electric brake devices each corresponding to one of a plurality of wheels.

BACKGROUND ART

Conventionally, development of a device including a plurality of electric brake devices individually corresponding to a plurality of wheels, and a braking control device, which controls each of the electric brake devices, has been proceeded as a braking system mounted on a vehicle (refer to Patent Document 1). Each of the electric brake devices configuring such a system includes a motor driven based on command signals from the braking control device and applies braking force in accordance with the current value for the motor to the corresponding wheel.

When the motor provided in each electric brake device continues to be used even if the temperature thereof becomes greater than or equal to a predetermined heatproof temperature, the motor is likely to have abnormalities. In the above described braking system, if any abnormal motor is present in the motors, a motor protection control for protecting the abnormal motor is performed. In the motor protection control, the current value for the abnormal motor, which corresponds to a first wheel (for example, the right front wheel) is rapidly reduced, and another motor (hereinafter, referred to as "normal motor") that to a second wheel (for example, the left front wheel) positioned opposite to the first wheel in the lateral direction of the vehicle is operated. Thereby, even if the braking force applied to the first wheel is reduced, the braking force applied to the second wheel is not reduced. Therefore, the reduction of the braking force applied to the entire vehicle is limited, and the abnormal motor is appropriately protected.

However, when the above described motor protection control is started, a braking force difference is generated between the braking force of the first wheel and the braking force of the second wheel (hereinafter, referred to as "right-and-left braking force difference"). As a result, the yaw moment of the vehicle becomes great so that the behavior of the vehicle is likely to be unstable. Accordingly, in the above described braking system, if the abnormal motor is present in the case where the running state of the vehicle is stable, the motor protection control is performed. The determination "whether the running state of the vehicle is stable" is performed by determining "whether the sideslip of the vehicle is unlikely to be caused", for example.

PRIOR ART DOCUMENT

Patent Document

Patent Document 1: Japanese Laid-Open Patent Publication No. 2001-158336

SUMMARY OF THE INVENTION

Problems that the Invention is to Solve

As described above, when the motor continues to be used even if the temperature thereof exceeds the heatproof temperature, the motor is likely to be broken. From a viewpoint of the motor protection, it is preferable that the motor be protected before the motor is broken. Accordingly, the braking system shown below has been devised in recent years.

That is, the temperature of each motor is periodically obtained and it is determined whether there is an overheated motor with a temperature greater than or equal to a temperature reference value, which is set below the heatproof temperature. If it is determined that any one of the motors is an overheated motor, the motor protection control is performed, in which the current value for the overheated motor is rapidly reduced, and the operation of the normal motors is continued. The increase of the temperature of the overheated motor is limited by performing such a control so that a phenomenon that the temperature of the overheated motor becomes greater than or equal to the heatproof temperature is avoided.

However, even in this case, the right-and-left braking force difference between the braking force applied to the first wheel corresponding to the overheated motor and the braking force applied to the second wheel corresponding to the normal motor is caused by the motor protection control. The greater the right-and-left braking force difference is, the greater the yaw moment of the vehicle becomes so that the behavior of the vehicle is likely to be unstable. Accordingly, it is necessary to set determination criteria to determine "whether the running state of the vehicle is stable" more severely to avoid the phenomenon that the vehicle is spun due to the motor protection control. That is, the opportunity of performing the motor protection control is limited.

An object of the present invention is to provide a vehicle braking control device, which, when any one of motors becomes overheated, can increase the opportunity of performing a motor protection control for protecting the overheated motor, and facilitate a vehicle operation for correcting a change of a vehicle behavior accompanying the motor protection control.

Means for Solving the Problems

In order to achieve the above described object, a vehicle braking control device, which controls a plurality of electric brake devices is provided. Each of the electric brake devices corresponds to one of a plurality of wheels provided in a vehicle, and each electric brake device includes a motor and is configured to apply braking force in accordance with a current value for the motor to the corresponding wheel. The vehicle braking control device includes a temperature obtaining portion, a determination portion, and a motor control portion. The temperature obtaining portion obtains a temperature of each motor. The determination portion determines whether the motors include an overheated motor, which has the obtained temperature greater than or equal to a temperature reference value set as a determination criterion to determine whether the motor tends to be overheated. When any one of the motors is determined to be the overheated motor, the motor control portion performs a motor protection control for reducing a current value for the overheated motor at a more gradual gradient in a case where the temperature of the overheated motor is low than in a case where the temperature of the overheated motor is high.

According to the above described configuration, when any one of the motors is overheated, the current value for the overheated motor is reduced to protect the overheated motor. Since the temperature of the overheated motor is comparatively low at the time when the motor is determined as overheated, the current value for the overheated motor is gradually reduced. Accordingly, when the temperature of the overheated motor is comparatively low, the rapid increase of the braking force difference between the braking force applied to the first wheel and the braking force applied to the second wheel accompanying the execution of the motor protection control is limited. The first wheel corresponds to a wheel to which the braking force is applied by the drive of the overheated motor. The second wheel corresponds to a wheel located opposite to the first wheel in the lateral direction of the vehicle. That is, at the time of starting the motor protection control, the vehicle behavior is not likely to be unstable when the motor protection control is performed in comparison to a conventional case where the current value for the overheated motor is rapidly reduced irrespective of the temperature of the motor.

As a result, when the motor protection control of the present invention is started, the vehicle behavior is gradually changed. However, since the change of the behavior is slower than the change in the conventional case, the driver of the vehicle is allowed to perform the vehicle operation for compensating for the change of the behavior accompanying the start of the above described motor protection control with ease. Accordingly, in comparison to the conventional case where the current value for the overheated motor is rapidly reduced irrespective of the high or low temperature of the overheated motor, the opportunity of performing the motor protection control is increased, and the vehicle operation for correcting the change of the vehicle behavior accompanying the motor protection control is facilitated.

In contrast, when the temperature of the overheated motor continues to be increased even if the motor protection control is performed so that the temperature of the overheated motor becomes comparatively high, the current value for the overheated motor is reduced more rapidly than in the case where the temperature of the overheated motor is low. Accordingly, the overheated motor is appropriately protected.

A wheel that corresponds to the electric brake device having the overheated motor is defined as a first wheel, and a wheel that is located on the opposite side to the first wheel in the lateral direction of the vehicle is defined as a second wheel. An electric brake device that corresponds to the second wheel has a normal motor. When performing the motor protection control, it is preferable that the motor control portion perform an adjustment control for increasing a current value for the normal motor mounted on the electric brake device, which corresponds to the second wheel.

According to the above described configuration, when the motor protection control is performed, the braking force applied to the second wheel is increased by increasing the current value for the normal motor mounted on the electric brake device corresponding to the second wheel. Even if the braking force applied to the second wheel is increased when the braking force applied to the first wheel is reduced as described above, the rapid increase of the braking force difference between the braking force applied to the first wheel and the braking force applied to the second wheel is limited since the reduction rate of the braking force applied to the first wheel is lower than the reduction rate in the above described conventional case. As a result, even if the adjustment control is performed in parallel with the motor protection control, the vehicle behavior at the time of starting both the controls changes more gradually than in the conventional case of starting the motor protection control and the adjustment control. This allows the driver of the vehicle to perform the vehicle operation for compensating for the change of the vehicle behavior accompanying the start of the above described motor protection control and the adjustment control with ease. Therefore, in comparison to the conventional case, the opportunity of performing the motor protection control and the adjustment control is increased, and the vehicle operation for correcting the change of the vehicle behavior accompanying the motor protection control and the adjustment control is facilitated. The amount of change of the braking force from the braking force applied to the entire vehicle prior to the start of the motor protection control and the adjustment control is reduced.

When performing the motor protection control, it is preferable that the motor control portion perform the adjustment control such that the current value for the normal motor is increased to compensate for an amount of reduction of the braking force applied to the entire vehicle caused by performing the motor protection control.

According to the above described configuration, when the motor protection control is performed, the braking force applied to the second wheel is increased by the adjustment control so that the reduction of the braking force applied to the entire vehicle is limited. Further, at the time of starting the motor protection control, the increase rate of the braking force applied to the second wheel is lower than the increase rate in the above described conventional case as well as the reduction rate of the braking force applied to the first wheel is lower than the reduction rate in the conventional case. Accordingly, the rapid increase of the braking force difference between the braking force applied to the first wheel and the braking force applied to the second wheel accompanying the execution of the motor protection control and the adjustment control is limited. As a result, even if the adjustment control is performed in parallel with the motor protection control, the vehicle behavior at the time of starting the controls changes more gradually than in the conventional case of starting the motor protection control and the adjustment control. This allows the driver of the vehicle to perform the vehicle operation for compensating for the change of the vehicle behavior accompanying the start of the above described motor protection control and the adjustment control with ease. Therefore, the opportunity of performing the motor protection control and the adjustment control is increased in comparison to the conventional case, while compensating for the reduction amount of the braking force applied to the entire vehicle.

When performing the motor protection control and the adjustment control, it is preferable that the motor control portion adjust the braking force applied to all the wheels other than the first wheel.

The vehicle braking control device further includes a yaw rate obtaining portion, which obtains an estimated value of a yaw rate generated on the vehicle by performing the motor protection control and the adjustment control.

When performing the motor protection control and the adjustment control, it is preferable that the motor control portion control the motors mounted on the electric brake devices for applying braking force to the wheels other than the first and second wheels to adjust the braking force applied to the wheels other than the first and second wheels such that the estimated value of the yaw rate obtained by the yaw rate obtaining portion approaches zero.

When both the motor protection control and the adjustment control are performed, the yaw rate is generated in the vehicle in accordance with the braking force difference between the braking force applied to the first wheel and the braking force applied to the second wheel. Accordingly, in the present invention, the estimated value of the yaw rate generated accompanying the execution of the above described both controls is obtained, and the braking force applied to the wheels other than the first and second wheels is adjusted such that the estimated value of the yaw rate approaches close to zero. Accordingly, the change of the vehicle behavior accompanying the motor protection control and the adjustment control is limited. Therefore, since the vehicle behavior is not likely to be unstable when the overheated motor is protected, the opportunity of performing the motor protection control and the adjustment control is increased, and the vehicle operation for correcting the change of the vehicle behavior accompanying the motor protection control is facilitated.

MODES FOR CARRYING OUT THE INVENTION

Hereinafter, an embodiment of the present invention will be illustrated with reference to FIGS. 1 to 6. In the description below, the traveling direction (advancing direction) of a vehicle is defined as front (vehicle forward direction).

Figure 1:
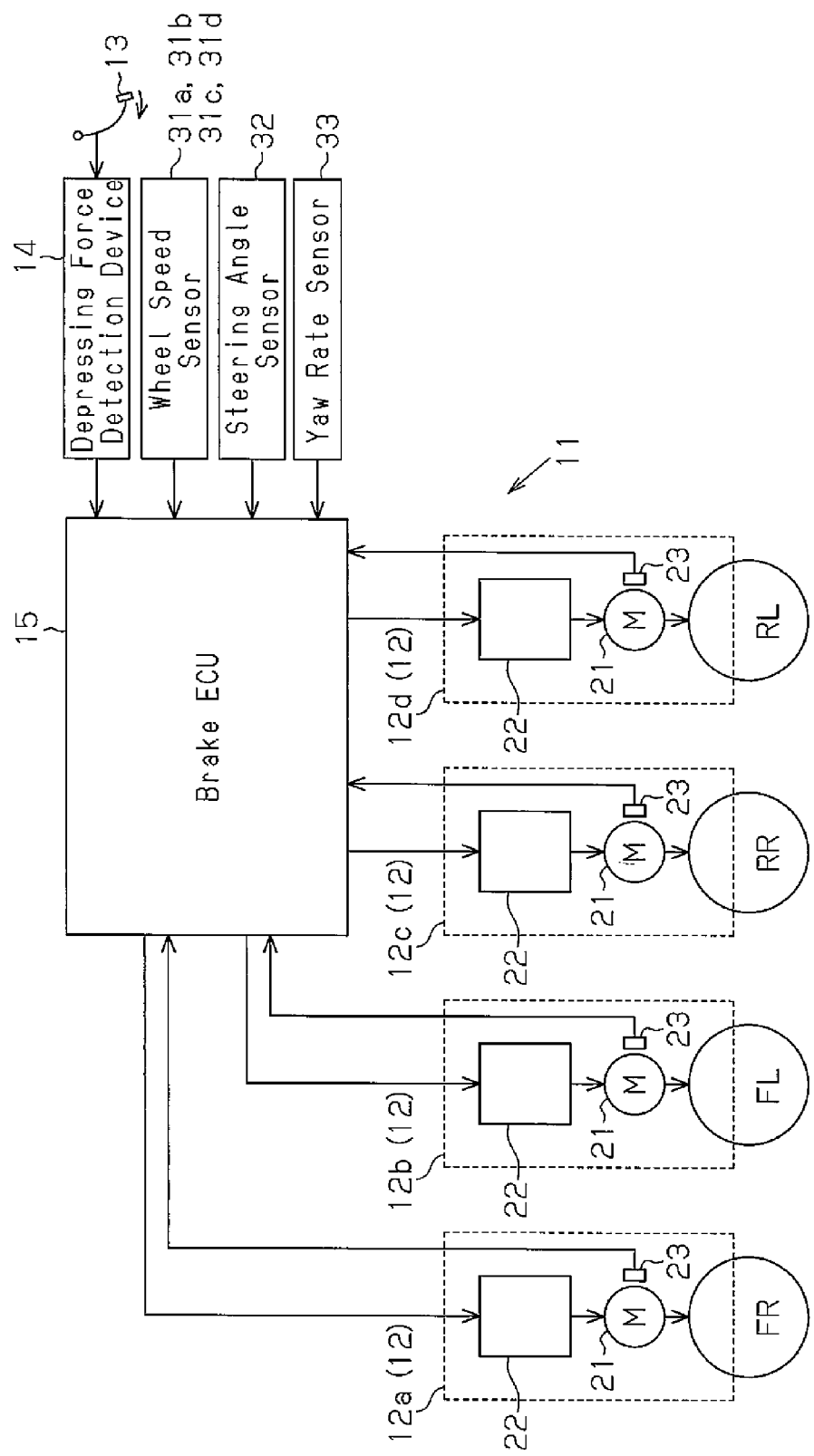
FIG. 1 is a block diagram illustrating a braking system including a vehicle braking control device according to the present invention.

As shown in FIG. 1, a plurality of (four in the present embodiment) wheels FR, FL, RR, and RL are provided in the vehicle. The front wheels FR and FL are arranged in front of the rear wheels RR and RL in the longitudinal direction of the vehicle. The right front wheel FR and the right rear wheel RR are arranged opposite to the left front wheel FL and the left rear wheel RL in the lateral direction of the vehicle, respectively. A braking system 11 mounted on the vehicle includes a plurality of (four in the present embodiment) electric brake devices 12 (12a, 12b, 12c, and 12d) individually corresponding to the wheels FR, FL, RR, and RL, a depressing force detection device 14 for detecting depressing force (also referred to as "operation amount") of a brake pedal 13 by a driver, and a brake ECU 15 as an example of a braking control device, which individually controls the electric brake devices 12a to 12d.

Next, the electric brake devices 12 will be described.

As shown in FIG. 1, each brake device 12 includes a motor 21, a motor drive circuit 22 driven to flow current through the motor 21 in accordance with command signals from the brake ECU 15, and a temperature sensor 23 for detecting the temperature of the motor 21. Detection signals on the basis of the temperature of the motor 21 are supplied from the temperature sensors 23 to the brake ECU 15.

Annular brake rotors (not shown), which rotate integrally with the wheels FR, FL, RR, and RL, and brake pads (not shown) arranged facing friction surfaces of the brake rotors are provided in the electric brake devices 12. When the motor 21 is driven, the corresponding brake pad approaches the brake rotor by the driving force from the motor 21. The brake pad slides on the corresponding brake rotor by pressing force in accordance with the driving force transmitted from the motor 21. That is, in the present embodiment, the driving force generated by the motors 21, i.e., the braking force in accordance with the current values for the motors 21, is applied to the wheels FR, FL, RR, and RL.

Next, the brake ECU 15 of the present embodiment will be described.

As shown in FIG. 1, wheel speed sensors 31a, 31b, 31c, and 31d for detecting the wheel rotation speed of the wheels FR, FL, RR, and RL, respectively are electrically connected to the brake ECU 15 in addition to the temperature sensors 23. A steering angle sensor 32 for detecting the steering angle of a steering wheel (not shown) mounted on the vehicle and a yaw rate sensor 33 for detecting a yaw rate of the vehicle are further electrically connected to the brake ECU 15. Also, signals (namely, depressing force signals) in accordance with the depressing force of the brake pedal 13 are supplied from the depressing force detection device 14 to the brake ECU 15. The brake ECU 15 sets the current value for the motor 21 of each electric brake device 12 such that the braking force in accordance with the braking force demanded by the driver (hereinafter, referred to as "the demanded braking force") is applied to the entire vehicle. The brake ECU 15 then supplies command signals on the basis of the set current value to each electric brake device 12.

The demanded braking force is set even when the driver does not operate the brake pedal 13. For example, at a time of vehicle controls including brake controls such as automatic stop control and constant speed running control, the demanded braking force is set to a value greater than zero.

The brake ECU 15 has a digital computer configured by a CPU, a ROM, and a RAM, which are not illustrated. Various control processes (for example, control processes shown in FIGS. 5 and 6), various maps (for example, maps shown in FIGS. 2 and 3), and various thresholds are stored in the ROM of the brake ECU 15 in advance. Various information (such as vehicle speed that will be described below), which can be rewritten as necessary during a period in which the ignition switch (not shown) in the vehicle is turned "ON", is temporarily stored in the RAM.

The motor 21 of each electric brake device 12 generates heat in accordance with the current that flows through the motor 21. If the amount of the generated heat is greater than the amount of the heat dissipated from the motor 21, the temperature of the motor 21 is increased. If the motor 21 continues to be used in the state where the temperature of the motor 21 is beyond the preset heatproof temperature, i.e., if the current continues to flow through the motor 21, the motor 21 is likely to be broken. Accordingly, if the temperature of the motor 21 becomes close to the heatproof temperature, it is preferable that the motor (hereinafter, referred to as "overheated motor") be protected before the temperature becomes greater than or equal to the heatproof temperature.

In the present embodiment, if it is determined that there is an overheated motor, the motor protection control is performed, in which the current value for the overheated motor is reduced to limit the increase of the temperature of the overheated motor. The change gradient (reduction rate) of the current value for the overheated motor at the time of performing the motor protection control is set on the basis of a map shown in FIG. 2.

When the motor protection control is started, a braking force difference is generated between the first wheel (for example, the right front wheel) to which the driving force is applied by the driving of the overheated motor, and the second wheel (for example, the left front wheel) positioned opposite to the first front wheel in the lateral direction of the vehicle (hereinafter, referred to as "right-and-left braking force difference"). The greater the right-and-left braking force difference is, the greater the yaw rate generated in the vehicle becomes so that the vehicle is likely to sideslip. That is, the vehicle behavior shows an unstable tendency. Accordingly, the execution of the motor protection control causing the right-and-left braking force difference to be generated is allowed only when it is determined that the running state of the vehicle is stable. Accordingly, in the present embodiment, it is determined whether the running state of the vehicle is stable using maps shown in FIGS. 3(a) and 3(b).

Figure 2:
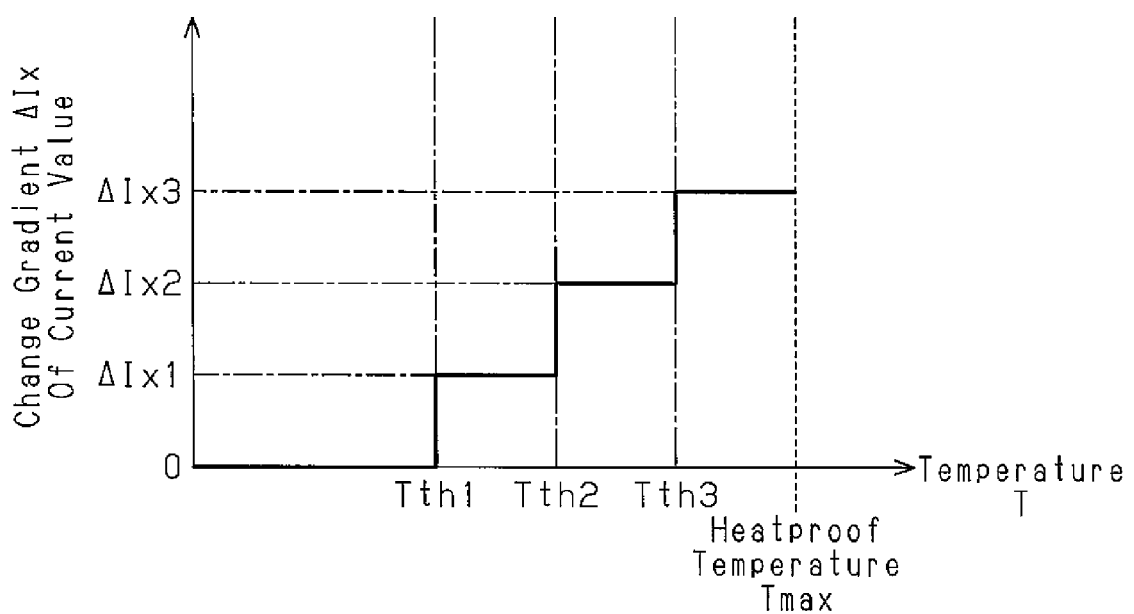
FIG. 2 is a map used for setting a change gradient of a current value in accordance with the temperature of an overheated motor.

Next, the maps shown in FIGS. 2, 3(a), and 3(b) will be described.

First, the first map shown in FIG. 2 will be described.

The first map is for setting, in the case where the temperature T of the overheated motor at this time is low, the change gradient ΔIx of the current value for the overheated motor as a value smaller than that in the case where the temperature T is high. That is, as shown in FIG. 2, in the present embodiment, a plurality of (here, three) set threshold values Tth1, Tth2, and Tth3 are preset as temperatures lower than a heatproof temperature Tmax. If the temperature T of the overheated motor is greater than or equal to the first set threshold value Tth1, which is the smallest of the set threshold values Tth1, Tth2, and Tth3, and less than the second set threshold value Tth2 (Tth2>Tth1), the change gradient ΔIx is set as a first gradient ΔIx1 (ΔIx1>0). Further, if the temperature T of the overheated motor is greater than or equal to the second set threshold value Tth2 and less than the third set threshold value Tth3 (Tth3>Tth2), the change gradient ΔIx is set as a second gradient ΔIx2, which is greater than the first gradient ΔIx1. Moreover, if the temperature T of the overheated motor is greater than or equal to the third set threshold value Tth3 and less than the heatproof temperature Tmax, the change gradient ΔIx is set as a third gradient ΔIx3, which is greater than the second gradient ΔIx2. The third gradient ΔIx3 is a value close to the change gradient of the current value for the overheated motor at the time of performing the conventional motor protection control.

Next, the second maps shown in FIGS. 3(a) and 3(b) will be described.

The second map is for determining whether the running state of the vehicle is stable on the basis of the steering angle θ of the steering wheel and vehicle body speed VS of the vehicle. More specifically, the second map shown in FIG. 3(a) is in the case where the left front wheel FL or the left rear wheel RL corresponds to the first wheel. In contrast, the second map shown in FIG. 3(b) corresponds to the case where the right front wheel FR or the right rear wheel RR is defined as the first wheel. In each second map, a region with hatched lines corresponds to a region on an unstable side, and a region without the hatched lines corresponds to a region on a stable side. That is, if the steering angle θ and the vehicle body speed VS belong to the region on the unstable side, it is determined that the running state of the vehicle is unstable. In contrast, if the steering angle θ and the vehicle speed VS belong to the region on the stable side, it is determined that the running state of the vehicle is stable.

Figure 3A:
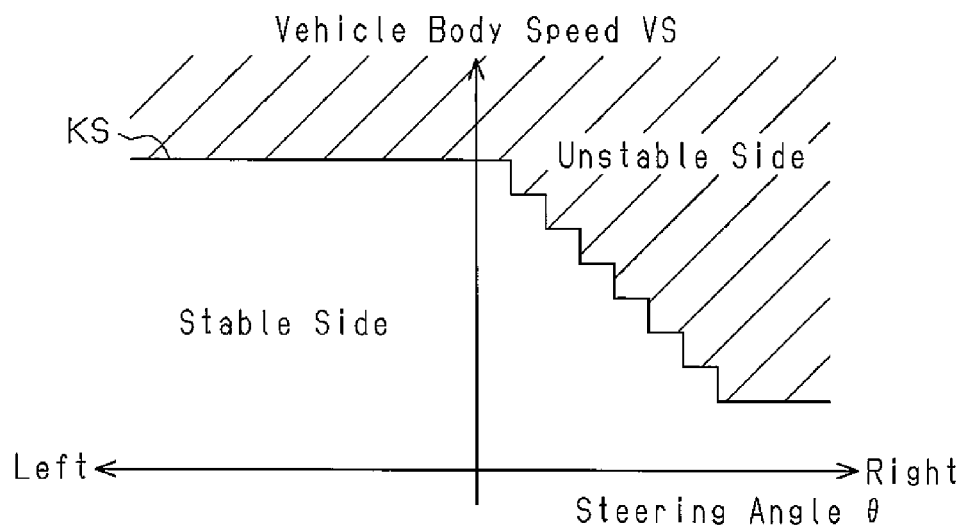
FIGS. 3(a) and 3(b) are maps used for determining whether the running state of a vehicle is stable.

As shown in FIG. 3(a), in the case where the vehicle turns to the left, when the left front wheel FL or the left rear wheel RL corresponds to the first wheel, the right front wheel FR or the right rear wheel RR positioned outward in the turning direction corresponds to the second wheel. When the motor protection control is performed in this state, the braking force applied to the wheel inward in the turning direction becomes smaller than the braking force applied to the wheel outward in the turning direction. As a result, yaw moment causing the vehicle to turn to the right is generated due to the right-and-left braking force difference. The yaw moment is opposite to the direction of the yaw moment generated on the basis of the operation of the steering wheel by the driver so that the spin tendency of the vehicle is not likely to be strong even if the right-and-left braking force difference is generated.

In contrast, in the case where the vehicle turns to the right, when the left front wheel FL or the left rear wheel RL corresponds to the first wheel, the right front wheel FR or the right rear wheel RR positioned inward in the turning direction corresponds to the second wheel. When the motor protection control is performed in this state, the braking force applied to the wheel inward in the turning direction becomes greater than the braking force applied to the wheel outward in the turning direction. As a result, yaw moment causing the vehicle to turn to the right is generated due to the right-and-left braking force difference. The yaw moment is in the direction the same as the direction of the yaw moment generated on the basis of the operation of the steering wheel by the driver. Accordingly, when the right-and-left braking force difference is generated, the spin tendency of the vehicle becomes strong.

Accordingly, in the case where the left front wheel FL or the left rear wheel RL corresponds to the first wheel, when the vehicle turns to the left, a vehicle speed determination value KS as a determination reference whether the running state of the vehicle is stable is set as a constant and comparatively great value, even if the absolute value of the steering angle θ of the steering wheel becomes greater. In contrast, in the case where the left front wheel FL or the left rear wheel RL corresponds to the first wheel, when the vehicle turns to the right, the vehicle speed determination value KS is set as a smaller value as the absolute value of the steering angle θ of the steering wheel becomes greater. As a result, when the motor 21 corresponding to the left front wheel FL or the left rear wheel RL is overheated, the opportunity of performing the motor protection control is increased more in the case where the vehicle turns to the left than in the case where the vehicle turns to the right.

Figure 3B:
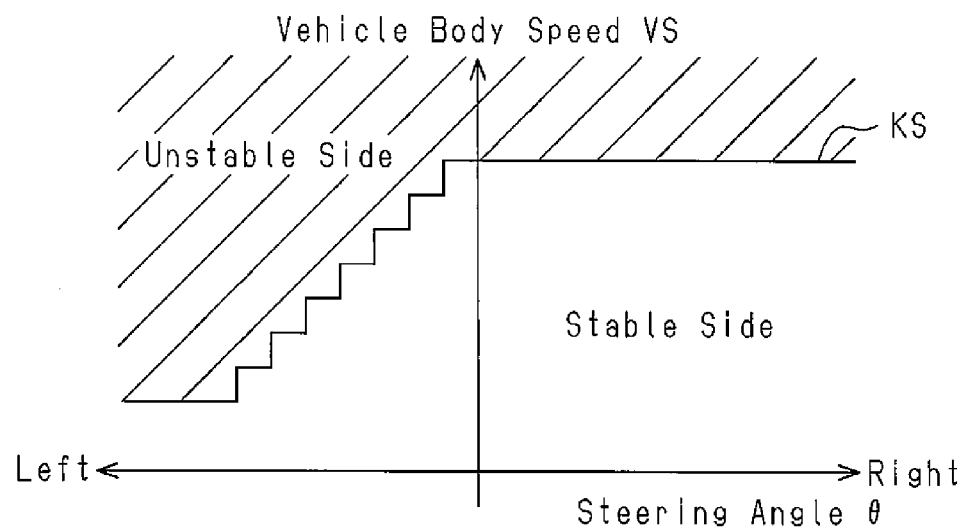

As shown in FIG. 3(b), in the case where the vehicle turns to the right, when the right front wheel FR or the right rear wheel RR corresponds to the first wheel, the left front wheel FL or the left rear wheel RL positioned outward in the turning direction corresponds to the second wheel. When the motor protection control is performed in this state, the braking force applied to the wheel inward in the turning direction becomes smaller than the braking force applied to the wheel outward in the turning direction. As a result, yaw moment causing the vehicle to turn to the left is generated due to the right-and-left braking force difference. The yaw moment is in the direction opposite to the direction of the yaw moment generated on the basis of the operation of the steering wheel by the driver. Accordingly, even if the right-and-left braking force difference is generated, the spin tendency of the vehicle does not become strong.

In contrast, in the case where the vehicle turns to the left, when the right front wheel FR or the right rear wheel RR corresponds to the first wheel, the left front wheel FL or the left rear wheel RL positioned inward in the turning direction corresponds to the second wheel. When the motor protection control is performed in this state, the braking force applied to the wheel inward in the turning direction becomes greater than the braking force applied to the wheel outward in the turning direction. As a result, yaw moment causing the vehicle to turn to the left is generated due to the right-and-left braking force difference. The yaw moment is in the direction the same as the direction of the yaw moment generated on the basis of the operation of the steering wheel by the driver. Accordingly, when the right-and-left braking force difference is generated, the spin tendency of the vehicle becomes strong.

Accordingly, in the case where the right front wheel FR or the right rear wheel RR corresponds to the first wheel, when the vehicle turns to the right, the vehicle speed determination value KS is set as a constant and comparatively great value, even if the absolute value of a steering angle θ of the steering wheel becomes greater. In contrast, in the case where the right front wheel FR or the right rear wheel RR corresponds to the first wheel, when the vehicle turns to the left, the vehicle speed determination value KS is set as a smaller value as the absolute value of the steering angle θ of the steering wheel becomes greater. As a result, when the motor 21 corresponding to the right front wheel FR or the right rear wheel RR is overheated, the opportunity of performing the motor protection control is increased more in the case where the vehicle turns to the right than in the case where the vehicle turns to the left.

Accordingly, in the present embodiment, the vehicle body speed VS of the vehicle corresponds to a stability index value showing the stability of the running state of the vehicle as a numerical value. Further, the vehicle speed determination value KS corresponds to a stability reference value as a determination criterion to determine whether the running state is stable.

Figure 4:
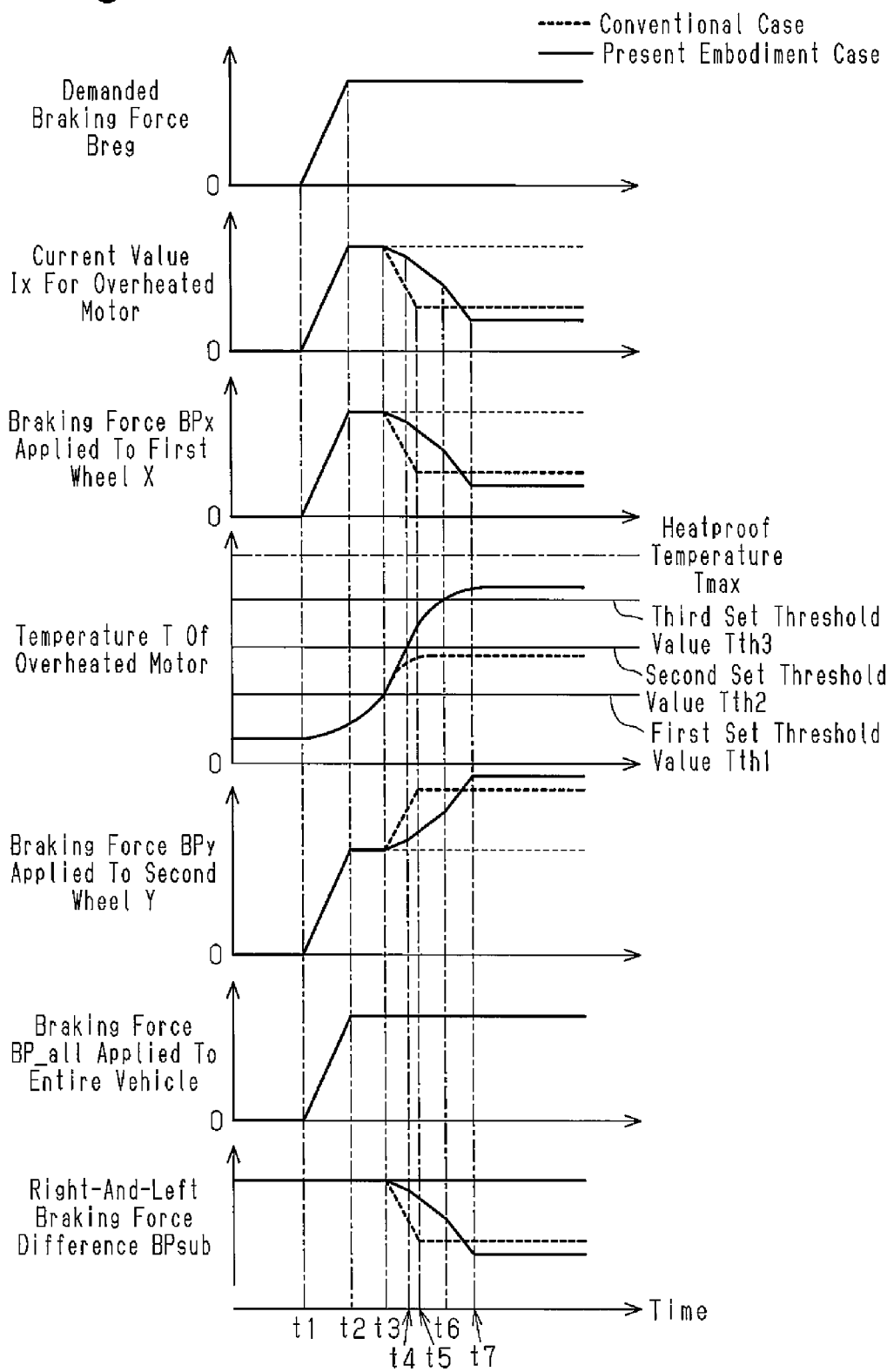
FIG. 4 is a timing chart for illustrating a motor protection control, in which the current value for the overheated motor is reduced.

Next, operation in the case where any one of the four motors 21 is overheated will be described with reference to the timing chart shown in FIG. 4. The dashed line shown in FIG. 4 shows the case where the overheated motor is protected by the conventional method. It is assumed that the running state of the vehicle is stable even if any one of the wheels FR, FL, RR, and RL becomes overheated.

As shown in the timing chart of FIG. 4, in a period after a first time point t1, in which a demanded braking force Breq is gradually increased from zero by the operation of the brake pedal 13 by the driver, for example, a braking force BP_all applied to the entire vehicle is increased to be close to the demanded braking force Breq. At this time, the current value for the motor 21 of each electric brake device 12 gradually becomes greater in accordance with the demanded braking force Breq. Then, the braking force in accordance with the current value for the corresponding motor 21 is applied to each of the wheels FR, FL, RR, and RL.

In a period after a second time point t2, in which the depressing force applied to the brake pedal 13 by the driver is constant, the demanded braking force Breq becomes constant as well. Then, the current value for each motor 21 is also set constant to maintain the braking force applied to each of the wheels FR, FL, RR, and RL. In a period after a subsequent third time point t3, if the temperature T of any one of the motors 21 (for example, the motor 21 for the right front wheel FR) becomes greater than or equal to the first set threshold value Tth1, the corresponding motor 21 is determined as overheated. At this time, the temperatures T of the motors 21 other than the overheated motor are sufficiently lower than the first set threshold value Tth1.

Then, the motor protection control for protecting the overheated motor, and the adjustment control for limiting the reduction of the braking force BP_all applied to the entire vehicle accompanying the execution of the motor protection control are started. The conventional motor protection control and the adjustment control will be described first.

That is, as shown by the dashed line in FIG. 4, in the conventional motor protection control, the protection of the overheated motor is given a top priority so that the current value Ix for the overheated motor is rapidly reduced. The change gradient of the current value Ix at this time is equal to or close to the above described third gradient ΔIx3. Then, the braking force BPx applied to the first wheel X is rapidly reduced according to the rapid reduction of the current value Ix for the overheated motor. As a result, the lower the current value Ix becomes, the less the amount of generation of heat by the overheated motor becomes. Accordingly, the temperature increase rate of the temperature T of the overheated motor becomes low. At a fifth time point t5, at which the increase rate of the temperature of the overheated motor becomes less than or equal to a preset prescribed rate, the likelihood that the temperature of the overheated motor exceeds the heatproof temperature Tmax is determined as low. Then, the reduction of the current value Ix for the overheated motor is stopped. Accordingly, in a period after the fifth time point t5, the temperature T of the overheated motor is maintained as the temperature immediately before the fifth time point t5, or a value close to the temperature.

If such a motor protection control is performed, the braking force BPx applied to the first wheel X is reduced. When the motor protection control is started, adjustment control for increasing braking force BPy applied to the second wheel Y positioned opposite to the first wheel X in the lateral direction of the vehicle is started as well. The amount of increase of the braking force BPy at this time is equivalent to the amount of reduction of the braking force BPx applied to the first wheel X. The reduction of the braking force BP_all applied to the entire vehicle is limited by adjusting the braking force BPy applied to the second wheel Y as described above.

However, in the conventional motor protection control, the braking force BPx applied to the first wheel X is rapidly reduced. Accordingly, in the adjustment control, the braking force BPy applied to the second wheel Y is rapidly increased to correspond to the rapid reduction of the braking force BPx applied to the first wheel X. As a result, the right-and-left braking force difference BPsub between the braking force applied to the first wheel X and the braking force applied to the second wheel Y is rapidly increased. That is, the vehicle behavior rapidly changes in accordance with the rapid increase of the right-and-left braking force difference BPsub.

As for this point, in the method of the present embodiment, even if any one of the motors 21 becomes overheated, the rapid change of the vehicle behavior is limited. That is, the change gradient of the current value Ix for the overheated motor is set more gradual in the case where the temperature T of the overheated motor at this time is low than in the case where the temperature T is high by using the first map shown in FIG. 2.

Accordingly, after the third time point t3, the current value Ix is more gradually reduced as the temperature T of the overheated motor is comparatively lower than in the case where the conventional motor protection control is performed. As a result, the braking force BPx applied to the first wheel X is more gradually reduced than in the case where the conventional motor protection control is performed. In the adjustment control, which is started simultaneously with the motor protection control, the braking force BPy applied to the second wheel Y is gradually increased as the reduction rate of the braking force BPx applied to the first wheel X is low. That is, in a period immediately after the overheated motor is detected, the right-and-left braking force difference BPsub is gradually increased. The vehicle behavior is thus gradually changed to the unstable side.

When the current value Ix for the overheated motor is gradually reduced as described above, the increase of the temperature of the overheated motor may be continued. At the fourth time point t4, at which the temperature T of the overheated motor becomes greater than or equal to the second set threshold value Tth2, the change gradient ΔIx of the current value Ix for the overheated motor is changed from the first gradient $\Delta Ix1$ to the second gradient $\Delta Ix2$. Then, after the fourth time point t4, as the change gradient $\Delta Ix$ becomes greater than the change gradient $\Delta Ix$ prior to the fourth time point t4, the reduction gradient of the braking force BPx applied to the first wheel X becomes greater. Accordingly, the increase gradient of the braking force BPy applied to the second wheel Y becomes steeper than the increase gradient prior to the fourth time point t4. However, since the second gradient $\Delta Ix2$ is a value smaller than the conventional change gradient of the current value Ix, the change amount of the right-and-left braking force difference BPsub after the fourth time point t4 is smaller than that in the conventional case. Accordingly, when the temperature T of the overheated motor is less than the third set threshold value Tth3, the vehicle behavior is more gradually changed to the unstable side than in the conventional case.

Although the amount of generation of heat in the overheated motor is reduced by increasing the change gradient $\Delta Ix$ of the current value Ix as described above, the temperature of the overheated motor continues to be increased if the amount of generation of heat is greater than the amount of dissipation of heat. At the sixth time point t6, at which the temperature T of the overheated motor becomes greater than or equal to the third set threshold value Tth3, the change gradient $\Delta Ix$ of the current value Ix for the overheated motor is changed from the second gradient $\Delta Ix2$ to the third gradient $\Delta Ix3$. That is, when the temperature T of the overheated motor becomes greater than or equal to the third set threshold value Tth3, the protection of the overheated motor is given a top priority. Then, after the sixth time point t6, the reduction gradient of the braking force BPx applied to the first wheel X and the increase gradient of the braking force BPy applied to the second wheel Y become equivalent to those in the conventional case.

As a result, although the change amount of the right-and-left braking force difference BPsub becomes equivalent to that in the conventional case, the increase of the temperature of the overheated motor is limited. At the seventh time point t7, at which the increase of the temperature of the overheated motor is excessively small, the current value Ix for the overheated motor is maintained.

Figure 5:
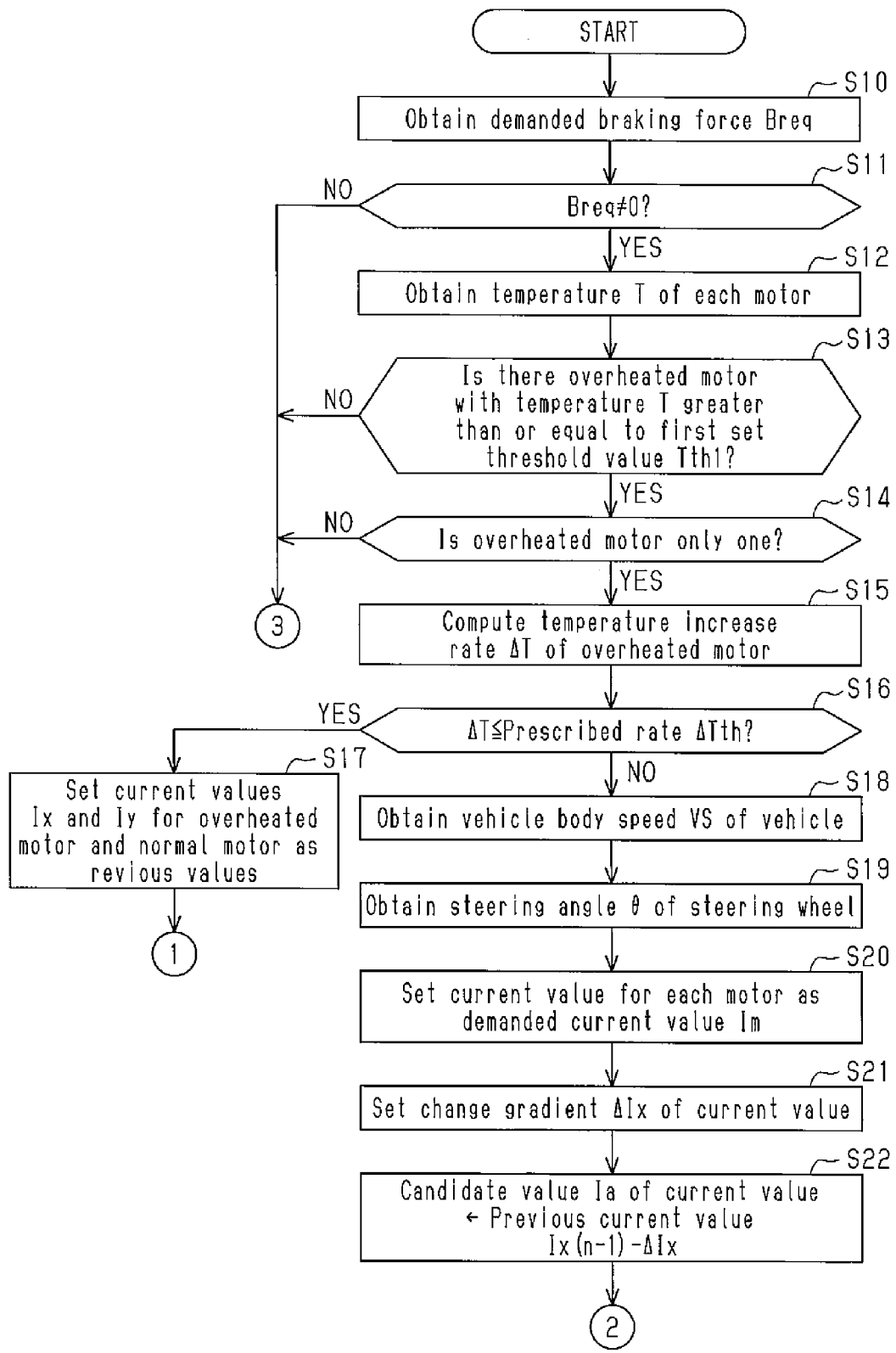
FIG. 5 is a former half portion of a flowchart showing a current value correction process routine according to the present embodiment.
Figure 6:
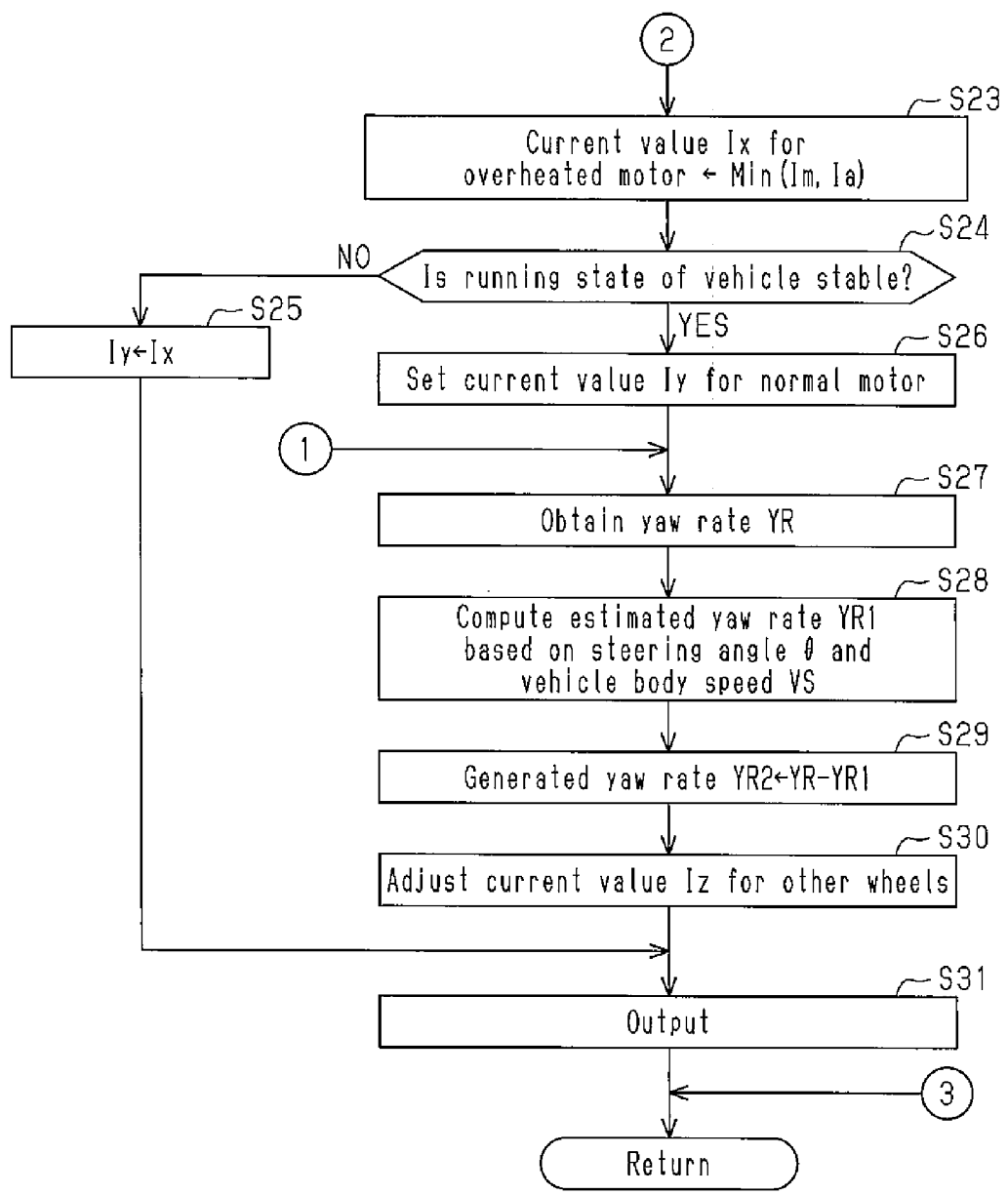
FIG. 6 is a latter half portion of the flowchart showing the current value correction process routine according to the present embodiment.

Next, a current value correction process routine executed by the brake ECU 15 when performing the above described motor protection control and the adjustment control will be described with reference to the flowcharts shown in FIGS. 5 and 6.

The current value correction process routine is performed every preset certain cycle (e.g., every 0.01 seconds). In the current value correction process routine, the brake ECU 15 obtains the demanded braking force Breq (step S10), and determines whether the obtained demanded braking force Breq is a value other than zero (step S11). If the demanded braking force Breq is zero (step S11: NO), the brake ECU 15 does not apply the braking force to any of the wheels FR, FL, RR, and RL. Accordingly, the current value correction process routine is temporarily terminated. In contrast, if the demanded braking force Breq is a value other than zero (step S11: YES), the brake ECU 15 obtains (computes) the temperature T of each of the motors 21 on the basis of the detection signals from each temperature sensor 23 of each of the electric brake devices 12a to 12d (step S12). Accordingly, in the present embodiment, the brake ECU 15 serves as a temperature obtaining portion.

The brake ECU 15 then determines whether there is a motor with the obtained temperature T that is greater than or equal to the first set threshold value Tth1, namely an overheated motor (step S13). In the present embodiment, the first set threshold value Tth1 corresponds to a temperature reference value, which is a determination criterion to determine whether each motor 21 tends to be overheated (that is, whether the temperature thereof tends to approach the heatproof temperature Tmax). Accordingly, in the present embodiment, the brake ECU 15 also serves as a determination portion, which determines whether there is the overheated motor in the motors 21.

If there is no overheated motor (step S13: NO), the brake ECU 15 temporarily terminates the current value correction process routine because the temperatures T of all the motors 21 are less than the first set threshold value Tth1. In contrast, if there is an overheated motor (step S13: YES), the brake ECU 15 determines whether the overheated motor is only one (step S14). If there are more than one overheated motors (step S14: NO), the brake ECU 15 temporarily terminates the current value correction process routine. In contrast, if the overheated motor is only one (step S14: YES), the brake ECU 15 computes the change amount of the temperature T of the overheated motor per unit time as the increase rate $\Delta T$ of the temperature of the overheated motor (step S15). The brake ECU 15 then determines whether the increase rate $\Delta T$ of the computed temperature is less than or equal to a prescribed rate $\Delta Tth$, which is set as a determination criterion to determine that the increase of the temperature of the overheated motor is almost not observed (step S16).

If the increase rate $\Delta T$ of the temperature exceeds the prescribed rate $\Delta Tth$ (step S16: NO), the brake ECU 15 determines that the increase of the temperature of the overheated motor is continued, and the process proceeds to step S18 described below. In contrast, if the increase rate $\Delta T$ of the temperature is less than or equal to the prescribed rate $\Delta Tth$ (step S16: YES), the brake ECU 15 determines that the increase of the temperature of the overheated motor is almost not observed, and the process proceeds to next step S17.

In step S17, the brake ECU 15 sets the current value Ix for the overheated motor and the current value Iy for the motor (hereinafter, referred to as a "normal motor") mounted on the electric brake device 12 corresponding to the second wheel Y as values that were set when the previous current value correction process routine was performed. The process of the brake ECU then proceeds to step S27 described below.

In step S18, the brake ECU 15 obtains the vehicle body speed VS of the vehicle on the basis of the detection signals from the wheel speed sensors 31a to 31d. The brake ECU 15 then obtains the steering angle $\theta$ of the steering wheel on the basis of the detection signals from the steering angle sensor 32 (step S19). In the present embodiment, the vehicle body speed VS is a parameter for determining whether the running state of the vehicle is stable, and corresponds to a stability index value. The steering angle $\theta$ is a parameter for setting the magnitude of the vehicle speed determination value KS, which is a stability reference value (refer to FIG. 3). Accordingly, in the present embodiment, the brake ECU 15 also serves as an index value obtaining portion.

The brake ECU 15 then sets the current value for each motor 21 as a demanded current value Im (step S20). The demanded current value Im corresponds to a current value in accordance with the demanded braking force Breq obtained in step S10. The brake ECU 15 then sets the change gradient $\Delta Ix$ of the current value Ix for the overheated motor using the first map shown in FIG. 2 (step S21). As a result, the change gradient $\Delta Ix$ is set more gradual in the case where the temperature of the overheated motor at this time is low than in the case where the temperature is high.

The brake ECU 15 then sets a current value candidate value Ia as a candidate value for the current value for the overheated motor (step S22). Specifically, the brake ECU 15 reads out the current value Ix for the overheated motor, which was set when the previous current value correction process routine was performed, from the RAM, and sets the current value as a previous current value Ix(n−1). The value "n" is the number of times of performing the current value correction process routine after the ignition switch of the vehicle, which is not shown, was turned ON. The brake ECU 15 then subtracts the change gradient ΔIx set in step S18 from the previous current value Ix(n−1), and sets the obtained computation result as the current value candidate value Ia (Ia=Ix(n−1)−ΔIx).

Then, the brake ECU 15 sets a present current value Ix for the overheated motor on the basis of the comparison result between the demanded current value Im for the overheated motor set in step S20, and the current value candidate value Ia computed in step S22 (step S23). In the present embodiment, the brake ECU 15 sets the lesser one of the demanded current value Im and the current value candidate value Ia as the present current value Ix for the overheated motor.

The brake ECU 15 determines whether the running state of the vehicle is stable using the second maps shown in FIGS. 3(*a*) and 3(*b*) (step S24). Specifically, if the first wheel X corresponding to the overheated motor is the left front wheel FL or the left rear wheel RL, the brake ECU 15 selects the second map shown in FIG. 3(*a*). If the first wheel X corresponding to the overheated motor is the right front wheel FR or the right rear wheel RR, the brake ECU 15 selects the second map shown in FIG. 3(*b*). The brake ECU 15 sets the vehicle speed determination value KS on the basis of the steering angle θ obtained in step S19 based on the selected second map. Then, the brake ECU 15 determines whether the vehicle body speed VS obtained in step S18 is less than the set vehicle speed determination value KS.

If the vehicle body speed VS is less than the vehicle speed determination value KS (step S24: YES), the brake ECU 15 determines that the running state of the vehicle is stable, and the process proceeds to step S26 described below. In contrast, if the vehicle body speed VS is greater than or equal to the vehicle speed determination value KS (step S24: NO), the brake ECU 15 determines that the running state of the vehicle is not stable, and the process proceeds to next step S25.

In step S25, the brake ECU 15 sets the current value Iy for the normal motor corresponding to the second wheel Y to be the same value as the current value Ix for the overheated motor. The process of the brake ECU 15 then proceeds to step S31 described below. In this case, the braking force BPy applied to the second wheel Y is equivalent to the braking force BPx applied to the first wheel X. Accordingly, the right-and-left braking force difference BPsub is almost zero. Therefore, although the braking force BP_all applied to the entire vehicle is reduced, the vehicle behavior is restricted from being unstable when protecting the overheated motor.

In step S26, the brake ECU 15 sets the current value Iy for the normal motor such that the reduction amount of the braking force BP_all applied to the entire vehicle caused by the reduction of the current value Ix for the overheated motor is compensated. For example, the brake ECU 15 computes a difference between the current value Ix set in step S23 and the previous current value Ix(n−1). The brake ECU 15 adds the computed difference to the current value for the normal motor that was set when the previous current value correction process routine was performed, and sets the addition result as the current value Iy for the normal motor. The process of the brake ECU 15 then proceeds to next step S27.

In step S27, the brake ECU 15 obtains a yaw rate YR of the vehicle on the basis of the detection signals from the yaw rate sensor 33. The yaw rate YR is a value including the yaw moment on the basis of the steering operation and the acceleration operation by the driver, and the yaw moment on the basis of the motor protection control and the adjustment control. Then, the brake ECU 15 computes an estimated yaw rate YR1 on the basis of the vehicle body speed VS and the steering angle θ obtained in steps S18 and S19 using a relational expression (equation 1) shown below (step S28). The computed estimated yaw rate YR1 is a value that corresponds the yaw moment generated on the vehicle on the basis of the steering operation and the acceleration operation by the driver. That is, if the right-and-left braking force difference BPsub is zero, the estimated yaw rate YR1 is almost equal to the yaw rate YR.

$$YR1 = \frac{VS \times \theta}{(L \times (A \times VS^2 + 1))} \quad \text{[Equation 1]}$$

where the value L is the wheelbase (distance between the front wheels and the rear wheels, and the value A is a stability factor (constant).

The brake ECU 15 subtracts the estimated yaw rate YR1 computed in step S28 from the yaw rate YR obtained in step S27, and sets the subtraction result as a generated yaw rate (estimated value of the yaw rate) YR2 (step S29). The generated yaw rate YR2 is a value that corresponds to the yaw moment that can be generated on the vehicle by performing the motor protection control and the adjustment control. Accordingly, in the present embodiment, the brake ECU 15 also serves as a yaw rate obtaining portion.

The brake ECU 15 then adjusts a current value Iz for the motor 21 of each electric brake device 12 corresponding to each of the wheels other than the first wheel and the second wheel of the wheels FR, FL, RR, and RL such that the generated yaw rate YR2 computed in step S29 is close to zero (step S30). For example, when the right front wheel FR (or the left front wheel FL) is the first wheel X and the left front wheel FL (or the right front wheel FR) is the second wheel Y, the rear wheels RR and RL correspond to the wheels other than the first wheel and the second wheel. When the braking force BPx applied to the right front wheel FR, which is the first wheel X, is reduced and the braking force BPy applied to the left front wheel FL, which is the second wheel Y, is increased, the brake ECU 15 adjusts the current value Iz for each motor 21 such that the braking force applied to the left rear wheel RL is greater than the braking force applied to the right rear wheel RR to compensate for the rightward yaw moment.

In contrast, when the right rear wheel RR (or the left rear wheel RL) corresponds to the first wheel X and the left rear wheel RL (or the right rear wheel RR) corresponds to the second wheel Y, the front wheels FR and FL correspond to the wheels other than the first wheel and the second wheel. The process of the brake ECU 15 then proceeds to next step S31.

In step S31, the brake ECU 15 outputs command signals corresponding to the set current value for each of the motors 21 to each of the electric brake devices 12*a* to 12*d*. Then, the current value for the motor 21 of each of the electric brake devices 12*a* to 12*d* becomes the current value on the basis of the inputted command signals. The braking force in accordance with the current value to each motor 21 is applied to each of the wheels FR, FL, RR, and RL. Accordingly, in the present embodiment, the brake ECU 15 also serves as a motor control portion. Thereafter, the brake ECU 15 temporarily terminates the current value correction process routine.

As described above, the present embodiment has the following advantages.

(1) When any one of the motors 21 is overheated, the current value Ix for the overheated motor is reduced to protect the overheated motor. At this time, the current value Ix for the overheated motor is reduced at more gradual gradient in the case where the temperature T of the overheated motor is low than in the case where the temperature T is high. Accordingly, in comparison to the conventional case where the current value Ix is reduced at a steep gradient regardless of the temperature T of the overheated motor, the rapid increase of the right-and-left braking force difference BPsub between the braking force applied to the first wheel X and the braking force applied to the second wheel Y is limited immediately after the start of the motor protection control.

(2) Although such motor protection control is started, if the increase of the temperature T of the overheated motor is continued, the change gradient $\Delta$Ix of the current value Ix of the overheated motor is changed to a greater value. That is, although the temperature T of one of the motors becomes greater than or equal to the first set threshold value Tth1, a sudden change of the vehicle behavior is preferentially limited if the temperature T of the motor is comparatively low. However, if the temperature T of the overheated motor becomes high, the protection of the overheated motor is preferentially performed. Accordingly, events in which the temperature T of the overheated motor becomes greater than or equal to the heatproof temperature Tmax are limited so that the overheated motor is appropriately protected.

(3) When the motor protection control is performed, the adjustment control, in which the braking force BPy applied to the second wheel Y is increased, is performed. In the case where both the adjustment control and the motor protection control are performed, the right-and-left braking force difference BPsub between the braking force applied to the first wheel X and the braking force applied to the second wheel Y is more gradually increased than in the conventional case since the reduction rate of the braking force BPx applied to the first wheel X is low. That is, a sudden change of the vehicle behavior accompanying the execution of the motor protection control and the adjustment control is limited.

(4) The reduction of the braking force BP_all applied to the entire vehicle is limited by increasing the braking force BPy applied to the second wheel Y by the reduction amount of the braking force BPx applied to the first wheel X by performing the motor protection control in parallel with the adjustment control. Accordingly, as the change of the braking force BP_all applied to the entire vehicle accompanying the execution of the motor protection control and the adjustment control is limited, an unreasonable sense accompanying the execution of the motor protection control and the adjustment control is hardly felt by the driver of the vehicle.

(5) The control configuration is employed in which the change gradient $\Delta$Ix is changed in accordance with the temperature T of the overheated motor. The vehicle behavior is thus gradually changed at the start of the motor protection control and the adjustment control. Accordingly, the driver of the vehicle is allowed to perform with ease the vehicle operation for compensating for the change of the vehicle behavior accompanying the execution of the motor protection control and the adjustment control. That is, this facilitates the vehicle operation that needs to be performed by the driver to correct the change of the vehicle behavior accompanying the motor protection control and the adjustment control.

(6) In comparison to the conventional case, a sudden change of the vehicle behavior immediately after the start of the motor protection control and the adjustment control is limited. Thus, the determination criterion (in the present embodiment, the vehicle speed determination value KS) to determine whether the running state of the vehicle is stable can be lenient. As a result, the opportunity of performing the motor protection control is increased in comparison to the conventional case.

(7) Further, in the present embodiment, when performing the motor protection control and the adjustment control, the braking force applied to the wheels other than the first wheel X and the second wheel Y is adjusted to cancel the yaw moment generated by the execution of the controls. Accordingly, the unstable state of the vehicle behavior accompanying the execution of the motor protection control and the adjustment control is limited. That is, in comparison to the case where the adjustment of the braking force applied to the wheels other than the first wheel and the second wheel is not performed, the determination criterion to determine whether the running state of the vehicle is stable can be further lenient. As a result, the opportunity of performing the motor protection control is further increased.

(8) When the increase rate $\Delta$T of the temperature of the first wheel X becomes less than or equal to the prescribed rate $\Delta$Tth by the execution of the motor protection control, it is determined that the amount of generation of heat in the overheated motor is substantially in equilibrium with the amount of dissipation of heat from the overheated motor. As a result, the reduction of the current value Ix for the overheated motor by the execution of the motor protection control is stopped. Accordingly, in comparison to the case where the reduction of the current value Ix is continued even if the increase rate $\Delta$T of the temperature becomes less than or equal to the prescribed rate $\Delta$Tth, the increase of the right-and-left braking force difference BPsub accompanying the execution of the motor protection control and the adjustment control is limited.

(9) When the demanded braking force Breq is reduced because the depressing force applied to the brake pedal 13 by the driver is weakened, for example, the demanded current value Im corresponding to the overheated motor set in step S20 may be less than the current value candidate value Ia computed in step S22. In this case, in the present embodiment, the current value Ix for the overheated motor is set as the demanded current value Im. Accordingly, the braking force BP_all applied to the entire vehicle is appropriately reduced in accordance with the reduction of the demanded braking force Breq.

The embodiment may be modified as in other embodiments described below.

In the above illustrated embodiment, in the case where the first wheel X corresponds to a wheel (the right front wheel FR or the right rear wheel RR) located inward in the turning direction when the vehicle turns to the right, it is not necessary to perform the braking control for cancelling the yaw moment (i.e., the generated yaw rate YR2) generated by the execution of the motor protection control and the adjustment control. That is, it is not necessary to perform the processes in steps S27 to S30. Similarly, in the case where the first wheel X corresponds to a wheel (the left front wheel FL or the left rear wheel RL) located inward in the turning direction when the vehicle turns to the left, it is not necessary to perform the braking control for cancelling the yaw moment (i.e., the generated yaw rate YR2) generated by the execution of the motor protection control and the adjustment control. That is, it is not necessary to perform the processes in steps S27 to S30.

In the above illustrated embodiment, the processes in steps S27 to S30 may be omitted. Even with this configuration, the opportunity of performing the motor protection control is increased more than the conventional case although the opportunity is less than the opportunity in the case where the processes in steps S27 to S30 are performed.

In the above illustrated embodiment, the adjustment control may correspond to a control in which the reduction of the braking force BP_all applied to the entire vehicle is limited by adjusting the braking force applied to the wheels (including the second wheel Y) other than the first wheel X.

In the above illustrated embodiment, the amount of increase of the braking force BPy applied to the second wheel Y when performing the motor protection control does not need to correspond to the amount of reduction of the braking force BPx applied to the first wheel X.

In the above illustrated embodiment, it is not necessary to perform the adjustment control when performing the motor protection control.

In the above illustrated embodiment, the motor protection control may be performed when the first wheel X corresponding to the overheated motor is the front wheel FR or FL.

In contrast, the motor protection control may be performed when the first wheel X corresponding to the overheated motor is the rear wheel RR or RL.

In the above illustrated embodiment, the change gradient ΔIx of the current value Ix may be set such that it is gradually increased as the temperature T of the overheated motor becomes higher. In this case, the change gradient £Ix may be set on the basis of the linear function or the quadratic function with the temperature T of the overheated motor as a parameter.

In the above illustrated embodiment, the temperature of each motor 21 may be an estimated value computed using the magnitude of the current value for the motor 21 and the conduction time as parameters.

In the above illustrated embodiment, it may be determined whether the running state of the vehicle is stable using the yaw rate YR of the vehicle. For example, if the yaw rate YR is less than a yaw rate determination value, it may be determined that the running state of the vehicle is stable. In this case, the yaw rate determination value may be set smaller as the vehicle body speed VS of the vehicle is higher. In such a control configuration, the yaw rate YR corresponds to the stability index value, which shows the stability of the running state of the vehicle as a numerical value, and the yaw rate determination value corresponds to the stability reference value, which is a determination criterion to determine whether the running state is stable.

In the above illustrated embodiment, in the case where the first wheel X corresponds to a wheel (the right front wheel FR or the right rear wheel RR) located inward in the turning direction when the vehicle turns to the right, the motor protection control and the adjustment control may be performed without performing the determining process in step S24. Similarly, in the case where the first wheel X corresponds to a wheel (the left front wheel FL or the left rear wheel RL) located inward in the turning direction when the vehicle turns to the left, the motor protection control and the adjustment control may be performed without performing the determining process in step S24. In this case, the yaw moment generated by performing the motor protection control and the adjustment control corresponds to the moment in the direction opposite to the direction of the yaw moment generated by the steering operation by the driver. Accordingly, even if the motor protection control and the adjustment control are performed, the vehicle behavior is restricted from being unstable.

Description Of The Reference Numerals 12, 12a to 12d . . . Electric Brake Device, 15 . . . Brake ECU as Braking control device (Temperature Obtaining Portion, Determination Portion, Motor Control Portion, Yaw Rate Obtaining Portion, Index Value Obtaining Portion), 21 . . . Motor, FR, FL, RR, RL . . . Wheel, KS . . . Vehicle Speed Determination Value as Example of Stability Reference Value, Ix . . . Current Value for Overheated Motor, Iy . . . Current Value for Normal Motor, T . . . Temperature, Tth1 . . . First Set Threshold Value as Temperature Reference Value, VS . . . Vehicle Speed as Example of Stability Index Value, X . . . First Wheel, Y . . . Second Wheel, YR . . . Yaw Rate as Example of Stability Index Value, and YR2 . . . Generated Yaw Rate as Estimated Value of Yaw Rate.

The invention claimed is:

1. A vehicle braking control device, which controls a plurality of electric brake devices, each of which corresponds to one of a plurality of wheels provided in a vehicle, wherein each electric brake device includes a motor and is configured to apply braking force in accordance with a current value for the motor to the corresponding wheel, the vehicle braking control device comprising:
a temperature obtaining portion, which obtains a temperature of each motor;
a determination portion, which determines whether the motors include an overheated motor, which has the obtained temperature greater than or equal to a temperature reference value set as a determination criterion to determine whether the motor tends to be overheated; and
a motor control portion, wherein, when any one of the motors is determined to be the overheated motor, the motor control portion performs a motor protection control for reducing a current value for the overheated motor at a more gradual gradient in a case where the temperature of the overheated motor is low than in a case where the temperature of the overheated motor is high.

2. The vehicle braking control device according to claim 1, wherein
a wheel that corresponds to the electric brake device having the overheated motor is defined as a first wheel,
a wheel that is located on the opposite side to the first wheel in the lateral direction of the vehicle is defined as a second wheel,
an electric brake device that corresponds to the second wheel has a normal motor, and
when performing the motor protection control, the motor control portion performs an adjustment control for increasing a current value for the normal motor mounted on the electric brake device, which corresponds to the second wheel.

3. The vehicle braking control device according to claim 2, wherein when performing the motor protection control, the motor control portion performs the adjustment control such that the current value for the normal motor is increased to compensate for an amount of reduction of the braking force applied to the entire vehicle caused by performing the motor protection control.

4. The vehicle braking control device according to claim 2, wherein when performing the motor protection control and the adjustment control, the motor control portion adjusts the braking force applied to all the wheels other than the first wheel.

5. The vehicle braking control device according to claim 4, further comprising a yaw rate obtaining portion, which obtains an estimated value of a yaw rate generated on the vehicle by performing the motor protection control and the adjustment control, wherein when performing the motor protection control and the adjustment control, the motor control portion controls the motors mounted on the electric brake devices for applying braking force to the wheels other than the first and second wheels to adjust the braking force applied to the wheels other than the first and second wheels such that the estimated value of the yaw rate obtained by the yaw rate obtaining portion approaches zero.

6. The vehicle braking control device according to claim 2, wherein when performing the adjustment control, the motor control portion adjusts the current values for the motors mounted on the electric brake devices corresponding to all the wheels other than the first wheel to increase the braking force applied to all the wheels other than the first wheel to compensate for an amount of reduction of the braking force applied to the entire vehicle caused by performing the motor protection control.

7. The vehicle braking control device according to claim 1, further comprising an index value obtaining portion, which obtains a stability index value showing stability of a running state of the vehicle, wherein the motor control portion allows execution of the motor protection control when the stability index value obtained by the index value obtaining portion is less than or equal to a stability reference value, which is a determination criterion to determine whether the running state of the vehicle is stable.

\* \* \* \* \*